United States Patent
Trzaskos et al.

(10) Patent No.: US 8,827,611 B2
(45) Date of Patent: Sep. 9, 2014

(54) FREE FORM CUTTING MACHINE

(75) Inventors: Piotr S. Trzaskos, Saratoga, CA (US); John P. Ternus, Redwood City, CA (US); Carlo Catalano, San Jose, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 13/218,212

(22) Filed: Aug. 25, 2011

(65) Prior Publication Data

US 2012/0312133 A1 Dec. 13, 2012

Related U.S. Application Data

(60) Provisional application No. 61/495,811, filed on Jun. 10, 2011.

(51) Int. Cl.
*B23D 13/02* (2006.01)
*B23D 5/00* (2006.01)

(52) U.S. Cl.
USPC .......... 409/293; 700/160; 409/292; 409/297; 82/1.11; 82/18; 82/131

(58) Field of Classification Search
CPC ............. B23B 5/36; B23D 5/00; B23D 13/02
USPC ............... 82/1.11, 18, 49, 11, 12, 11.2, 11.3, 82/11.1, 131, 130, 118; 409/291, 292, 409/297, 289; 700/160, 190
See application file for complete search history.

(56) References Cited

U.S. PATENT DOCUMENTS

| | | | |
|---|---|---|---|
| 4,648,295 A * | 3/1987 | Ley et al. .......................... 82/18 |
| 4,801,226 A * | 1/1989 | Gleason ........................ 409/244 |
| 5,085,109 A | 2/1992 | Hidehiko et al. |
| 5,713,253 A * | 2/1998 | Date et al. ....................... 82/1.11 |
| 5,885,199 A | 3/1999 | Shao |
| 6,761,096 B1 * | 7/2004 | Kochsiek ........................ 82/1.11 |
| 6,918,326 B2 | 7/2005 | Mitsuzono et al. |
| 7,089,836 B2 | 8/2006 | Kato et al. |
| 7,634,957 B2 * | 12/2009 | Ghosh et al. .................... 82/1.11 |
| 7,647,854 B2 | 1/2010 | Loustanau et al. |

FOREIGN PATENT DOCUMENTS

| | | |
|---|---|---|
| CN | 86206789 | 12/1987 |
| CN | 1699001 | 11/2005 |

(Continued)

OTHER PUBLICATIONS

"Moore Nanotech 350FG Ultra-Precision Freeform Generator" Moore Nanotechnology Systems, LLC, Swanzey, NH 03446, Jun. 2011.

(Continued)

*Primary Examiner* — Daniel Howell
*Assistant Examiner* — Nicole N Ramos
(74) *Attorney, Agent, or Firm* — Womble Carlyle Sandridge Rice LLP

(57) ABSTRACT

A free form cutting machine is disclosed. The free form cutting machine includes a table, a spindle; and a cutting arrangement attached to the spindle. The cutting arrangement having at least a cutting tool used to cutting selected portions from a workpiece on the table. The free form cutting machine causes the cutting tool to apply a continuous shaping force to the surface of the workpiece until a first surface shape of the workpiece conforms with a predefined finished spline surface shape.

25 Claims, 10 Drawing Sheets

(56) References Cited

FOREIGN PATENT DOCUMENTS

| | | | |
|---|---|---|---|
| DE | 3317178 A1 | * | 11/1984 |
| GB | 2135232 A | * | 8/1984 |
| JP | 10138005 A | * | 5/1998 |
| WO | WO9749521 | | 12/1997 |

OTHER PUBLICATIONS

"Mapal Tooltronic", Mapal Prazisionswerkzeuge, Aalen, Germany, Apr. 2011.
Chinese Application for Invention No. 201210169463.1—First Office Action dated Mar. 13, 2014.

* cited by examiner

FREE FORM CUTTING MACHINE

This application claims priority to and the benefit under 35 U.S.C. §119(e) of U.S. Provisional Application Ser. No. 61/495,811, filed Jun. 10, 2011, entitled FREE FORM CUTTING MACHINE by Catalano et al, the entire disclosure of which is hereby incorporated herein by reference.

BACKGROUND OF THE INVENTION

1. Field of the Invention

The present invention relates generally to the machining of a spline shaped workpiece. In particular a free form cutting machine that simplifies the machining of the spline shaped object is described.

2. Related Art

Machining is a process by which pieces of material are mechanically cut to achieve a desired geometry. Milling machines, lathes, and drill presses are commonly used to machine materials such as wood, plastic, and metal into objects with geometries requiring a high degree of precision. A conventional turning machine (the most common embodiment being a lathe) typically utilizes a single edged cutting tool to shape a workpiece. A typical configuration includes a spindle which rotates the workpiece that is then engaged by a cutting tool. The cutting tool position can be moved closer or farther from the rotating workpiece, but the cutting tool orientation is typically set to a fixed angle. Unfortunately, while this configuration works quite well for machining a cylindrically shaped workpiece, a more complex shape is more difficult. Because the cutting tool orientation cannot be adjusted while it cuts, a non-cylindrical workpiece will change the angle between the workpiece and the blade as it turns.

For example, using this configuration to machine a spline shaped workpiece, would result in what is commonly referred to in the industry as a crash. The turning machine cutting tool crashes when a flank portion of the blade (essentially the bottom face of the cutting tool) comes into contact with the workpiece surface. The cutting tool is typically designed to operate with a relief angle between the flank portion of the cutting tool and the workpiece surface. The relief angle ensures the only portion of the tool in contact with the workpiece surface is a single cutting tool edge of the flank (essentially the forward edge of the flank). A crash will typically occur as the cutting tool tries to cut around the rounded corners of the workpiece. The orientation of the cutting tool with relation to the workpiece surface changes too much reducing the relief angle to zero and putting the flank of the cutting tool into contact with the workpiece.

Therefore a machine that allows for the creation of complex geometries in a single pass is desired.

SUMMARY OF THE DESCRIBED EMBODIMENTS

A method of machining a workpiece by applying a continuous shaping force to a surface of the workpiece by a cutting tool until a first surface shape of the workpiece conforms to a predefined finished spline surface shape. The shaping force is applied while the cutting tool is maintained at a predetermined cutting tool angle at all points on the workpiece surface, in accordance with the surface of the workpiece, despite rapid variations in workpiece surface geometry.

A free form cutting machine is also claimed. The free form cutting machine includes a table, a spindle; and a cutting arrangement attached to the spindle. The cutting arrangement having at least a cutting tool used to cutting selected portions from a workpiece on the table, wherein the free form cutting machine causes the cutting tool to apply a continuous shaping force to the surface of the workpiece until a first surface shape of the workpiece conforms with a predefined finished spline surface shape.

In another embodiment, non-transient computer readable medium for storing computer code executable by a processor coupled to a free form cutting machining for machining a workpiece is disclosed. The non-transient computer readable medium includes at least computer code for applying a continuous shaping force to a surface of the workpiece by a cutting tool until a first surface shape of the workpiece conforms with a predefined finished spline surface shape, wherein the cutting tool is maintained at a predetermined cutting tool angle at all points on the workpiece surface, in accordance with the surface of the workpiece, despite rapid variations in workpiece surface geometry.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
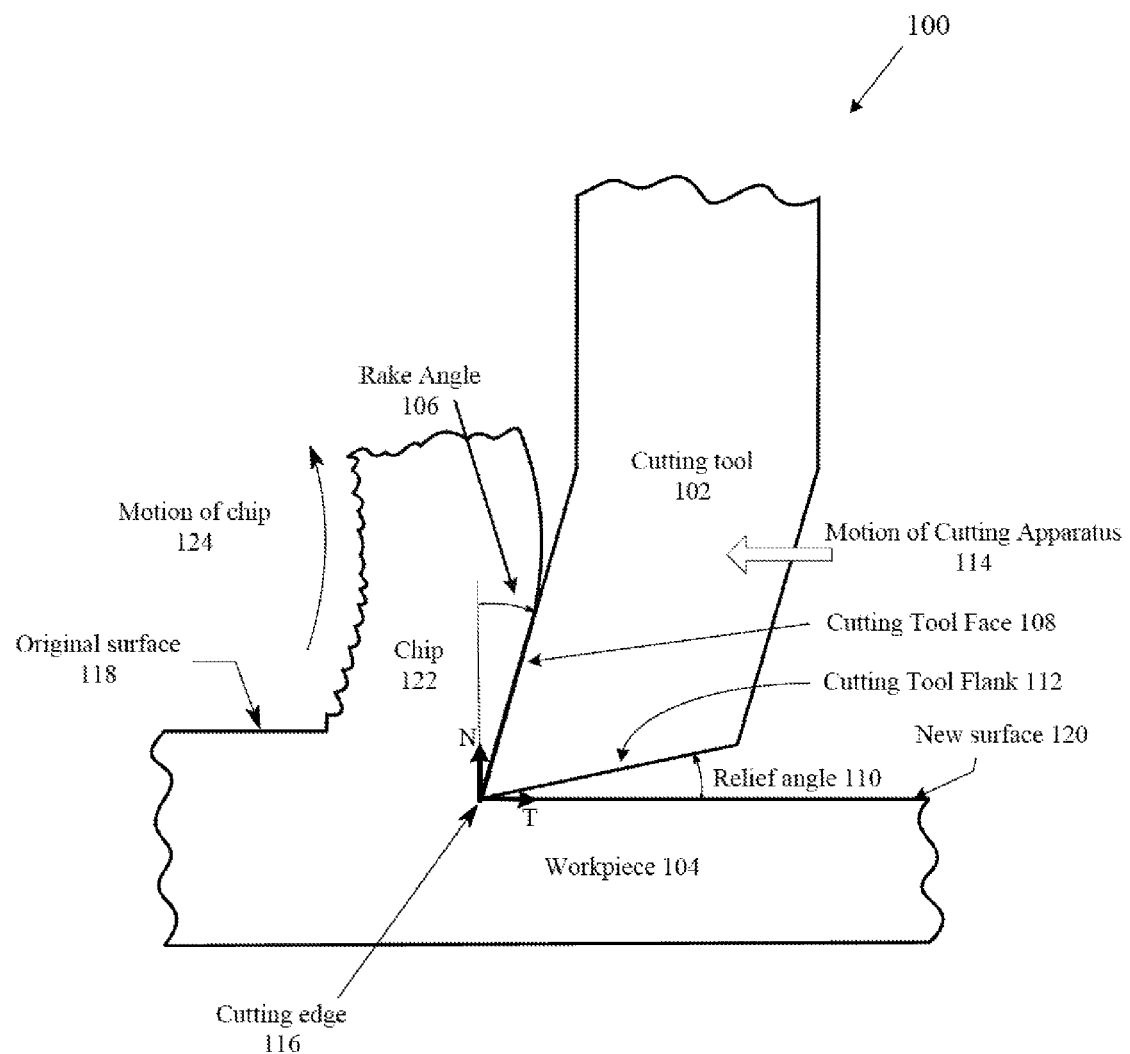
FIG. 1 shows a front view of the orientation of a cutting tool with respect to a surface of the workpiece in accordance with the described embodiments.

In the following description, numerous specific details are set forth to provide a thorough understanding of the present invention. It will be apparent, however, to one skilled in the art that the presently described embodiments may be practiced without some or all of these specific details.

Machining allows the production of objects with highly precise geometries. Milling machines, lathes, and drill presses are the most commonly used tools to machine materials such as wood, plastic, and metal. Historically the process of machining an object, commonly referred to as a workpiece, into a finished product was lengthy, as it was typically performed manually by one person working on one piece at a time, one cut at a time. This process has been substantially abbreviated with the integration of computers. Today a user can use Computer Aided Drafting (CAD) tools and Computer Aided Manufacturing (CAM) tools to send a computer, coupled to a machining tool, instructions for shaping a workpiece into a wide variety of different geometries. A computer coupled machine used to produce the workpiece, is typically known as Computer Numerical Control (CNC) machine. Unfortunately, the advent of CNC machines has not solved all of the inefficiencies in the machining industry.

For example, a milling machine is the tool of choice when creating complex shapes. Unfortunately, to accomplish the machining of complex parts, the milling machine must make multiple passes across the workpiece, resulting in imperfections in the workpiece surface; this is especially true when trying to create a curved surface, such as a spline shape, since the milling machine can only cut in one plane at a time. As the milling machine varies the angle of each pass to form the curved surface, small ridges are generally visible in the workpiece. This results in a workpiece that is not finished, and must generally be put through additional steps of sanding and polishing to achieve a desirably smooth surface like that found on the aluminum unibody MacBook Pro® manufactured by Apple Inc. of Cupertino, Calif. While standard machining tools include pressure sensors that allow users to accurately predict required replacement times, the additional sanding and polishing steps required after conventional cutting machine operations are especially cumbersome, as polishing pads and sanders tend to wear unpredictably, requiring them to be checked for wear much more frequently than standard machining tools. Sanding and polishing aluminum also creates a significant amount of aluminum dust which has significant detrimental effects on the environment.

The solution to this problem is the free form cutting machine, which uses the CNC machining process in combination with an enhanced turning machine. As discussed above, CNC machines have been used to automate existing manual processes. One of the more important innovations of the free form cutting machine is the idea of using the machine to automate a process that could not be accomplished manually. Keeping the cutting tool oriented at a consistent angle to a non-circular workpiece surface while the workpiece spins requires an extremely high level of speed and precision, simply not achievable by human hands. A CNC can accomplish this precise positioning and orientation through the use of robust, highly precise servo mechanisms. A servo linear drive controls the radial distance between the cutting tool and the workpiece, while a servo rotary drive controls the cutting tool orientation to the workpiece surface. The combination of these two servos allows the free form cutting machine to quickly machine complex spline shaped workpieces.

Because, like the conventional turning machine, the free form cutting machine's cutting tool maintains constant contact with the workpiece surface, there are no ridges or imperfections left, like those made by a milling machine. In addition to maintaining constant contact with the workpiece surface, keeping the orientation angle consistent maximizes cutting tool efficiency.

FIG. 1 shows portion 100 of cutting tool 102 with respect to workpiece 104 during a representative finishing operation in accordance with the described embodiments. Workpiece 104 can be formed of many materials such as aluminum, stainless steel, plastic, or even wood. It should be noted, however, that the composition of cutting tool 102 can depend upon the material from which workpiece 104 is formed and/or a desired surface or finish. For example, when a mirror finish is desired, cutting tool 102 can be formed with silicon crystal diamond. When a rougher surface is sufficient, cutting tool 102 can be formed with carbide or polycrystalline diamond. Each type of material being cut has an ideal rake angle 106 and relief angle 108 that allow for the smoothest most efficient cuts. This makes it important for the free form cutting machine to maintain the cutting tool orientation precisely. Rake angle 106 is defined as the angle between cutting tool face 108 and vector N normal to the surface of workpiece 104. Relief angle 110 is defined as the angle between cutting tool flank 112 and vector T tangent to the surface of workpiece 104. When optimal values of rake angle 106 and relief angle 108 are achieved, cutting tool 102 can require less applied force to maintain motion of cutting apparatus 114. Moreover, the useful operating life of cutting tool 102 is also generally longer. As shown in FIG. 1, cutting edge 116 of cutting tool 102 resurfaces original surface 118 of workpiece 104 into new surface 120 by removing a portion of workpiece 104 in the form of chip 122. It should be noted that due to the reduced environmental impact, the removal of solid chips, is preferred to generating copious amounts of dust generated through sanding and polishing operations.

Figure 2:
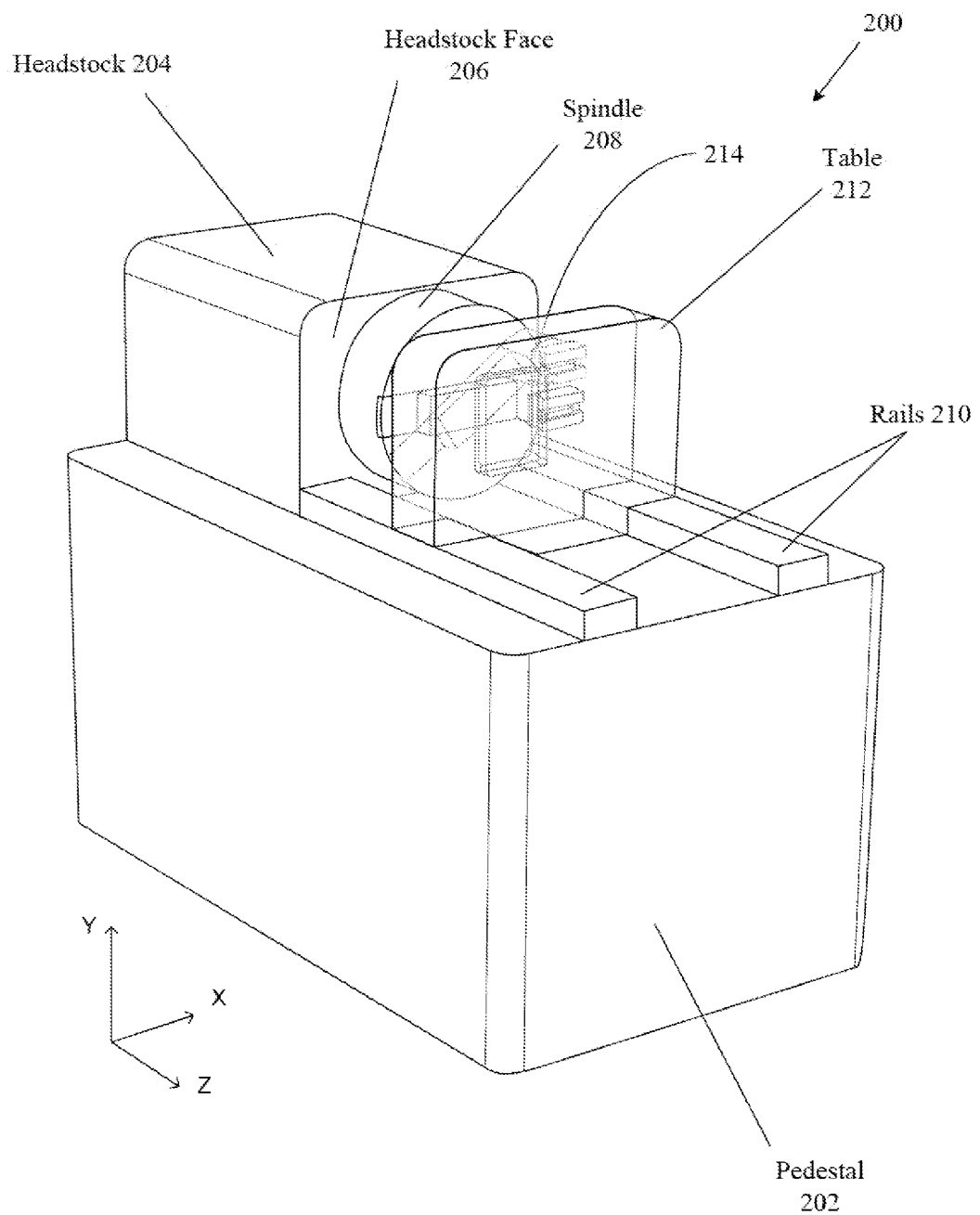
FIG. 2 shows a perspective view of a free form cutting machine in accordance with one of the described embodiments.

FIG. 2 shows a perspective view of free form cutting machine 200 in accordance with the described embodiments. Machine 200 can include at least pedestal 202 that can support headstock 204 having headstock face 206 on which is attached spindle 208. In this embodiment, headstock 204 can include a gear motor (not shown) used for rotating spindle 208. Rails 210 can be attached a top surface of pedestal 202. In this way, objects placed on rails 210 can be transported perpendicular to headstock face 206 in either direction to bring table 212 (shown as a line diagram for clarity) on which a workpiece can be placed. In this way, the workpiece can be brought closer or farther from cutting arrangement 214 attached to spindle 208 as desired.

Figure 3:
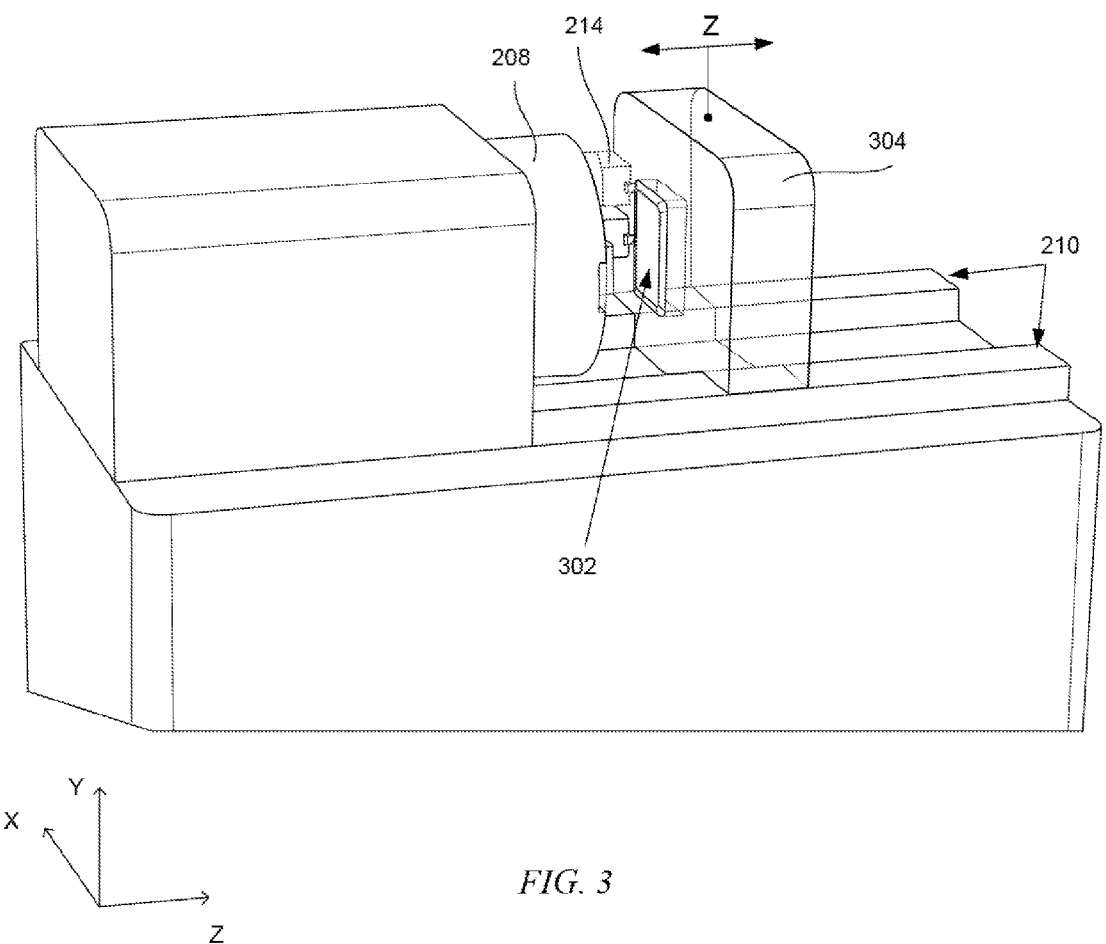
FIG. 3 shows a side view of the free form cutting machine showing the workpiece motion in the Z-axis as a cutting tool traverses it.

FIG. 3 shows a side view of free form cutting machine 200 highlighting the relationship between workpiece 302 mounted to table 304, spindle 208, and cutting arrangement 214. As can be seen, the motion of table 304 in the Z direction using rails 210 can be used to control a contact point between a surface of workpiece 302 and cutting arrangement 214.

Figure 4:
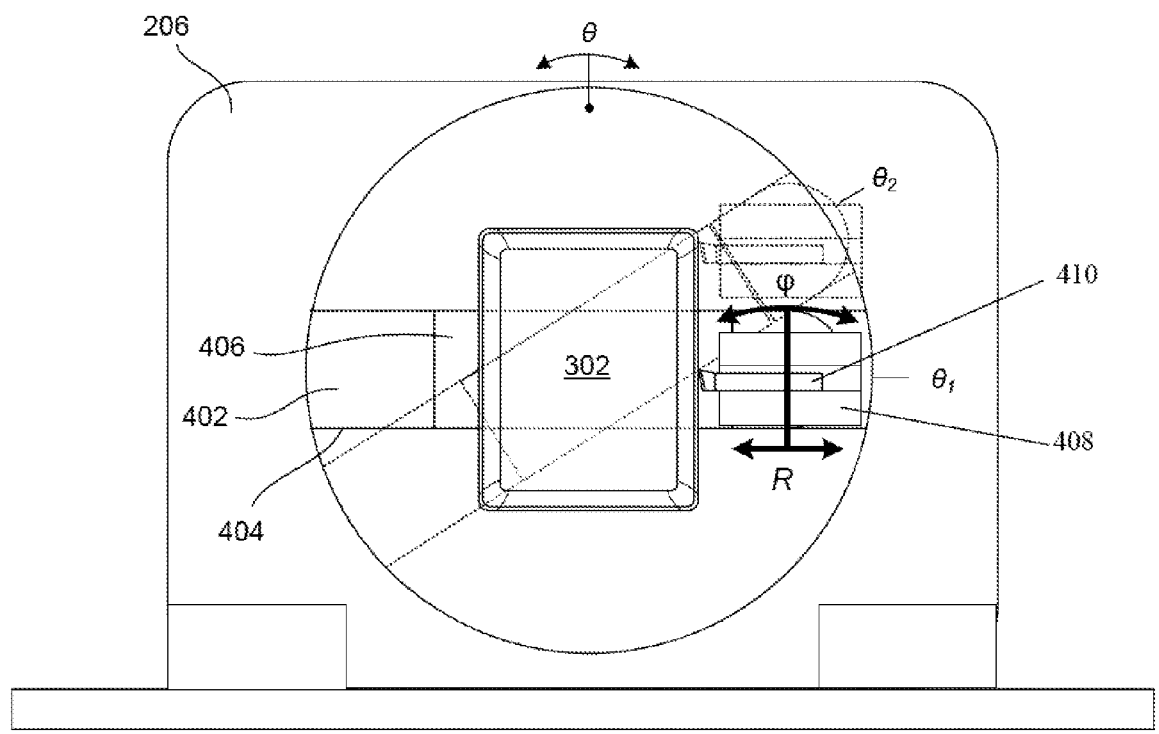
FIG. 4 shows a front view of the free form cutting machine showing how the servos adjust the orientation of the cutting tool.

FIG. 4 shows a front view of free form cutting machine 200. This view shows rotating disk 402 attached to the front of spindle 208 (not shown). Rotating disk 402 has disk channel 404, running through the center of rotation of rotating disk 402. Disk channel 404 allows a servo linear drive 406 to be mounted in disk channel 404 of rotating disk 402. Servo linear drive 406 traverses along disk channel 404 in a direction R, radial to a center of rotation of rotating disk 402. Also shown is a servo rotary drive 408, attached to one end of servo linear drive 406. Servo rotary drive 408 is capable of rotating 360 degrees, which allows it to orient cutting tool 410 for cutting the outside or inside surface of workpiece 302. It should be noted here that replacing servo rotary drive 408 with an adjustable CAM mechanism is also considered to be within the scope of the disclosed free form cutting machine. As rotating disk 402 rotates the combination of servo linear drive 406 and servo rotary drive 408 allows cutting tool 410, rigidly attached to servo rotary drive 408, to traverse a surface of workpiece 302. A second position $\theta_2$ is depicted to show how the servos adjust to maintain the cutting tool position and orientation in positions $\theta_1$ and $\theta_2$.

Figure 5:
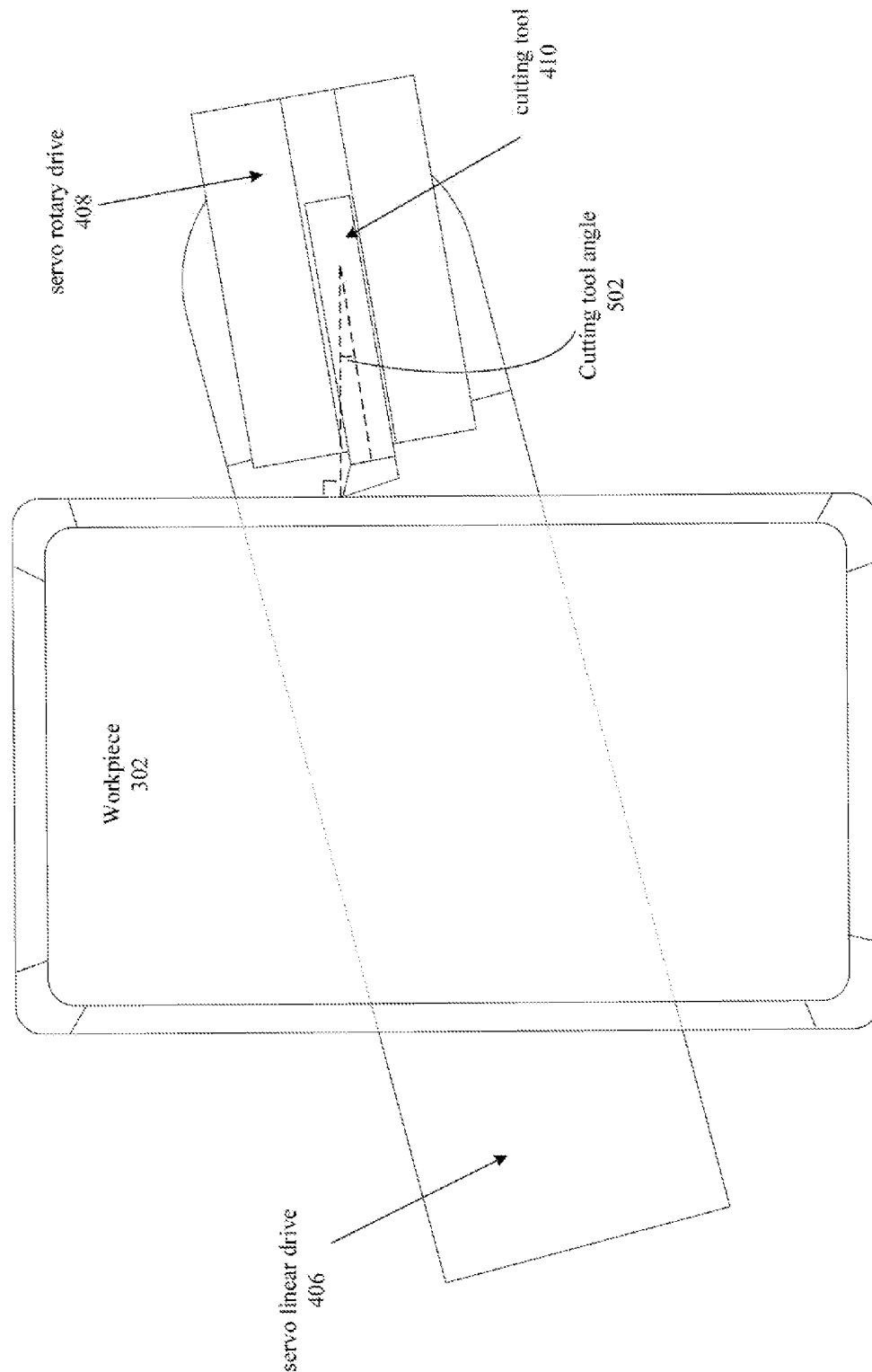
FIG. 5 shows a close up of the cutting tool attached to the servos, and how it is oriented in relation to the workpiece.

FIG. 5 shows an enlarged view of FIG. 4. More specifically it focuses on the orientation of cutting tool 410 with relation to the surface of workpiece 302. For cutting tool 410 to maintain a consistent orientation to the surface of workpiece 302, a cutting tool angle 502 must be maintained constant by servo rotary drive 408, to the extent allowed by the tolerances of the machine. By maintaining cutting tool angle 502, rake angle 104 and relief angle 106 from FIG. 1 also remain constant and the result can be an effectively unblemished surface on a complex spline shaped workpiece.

Figure 6:
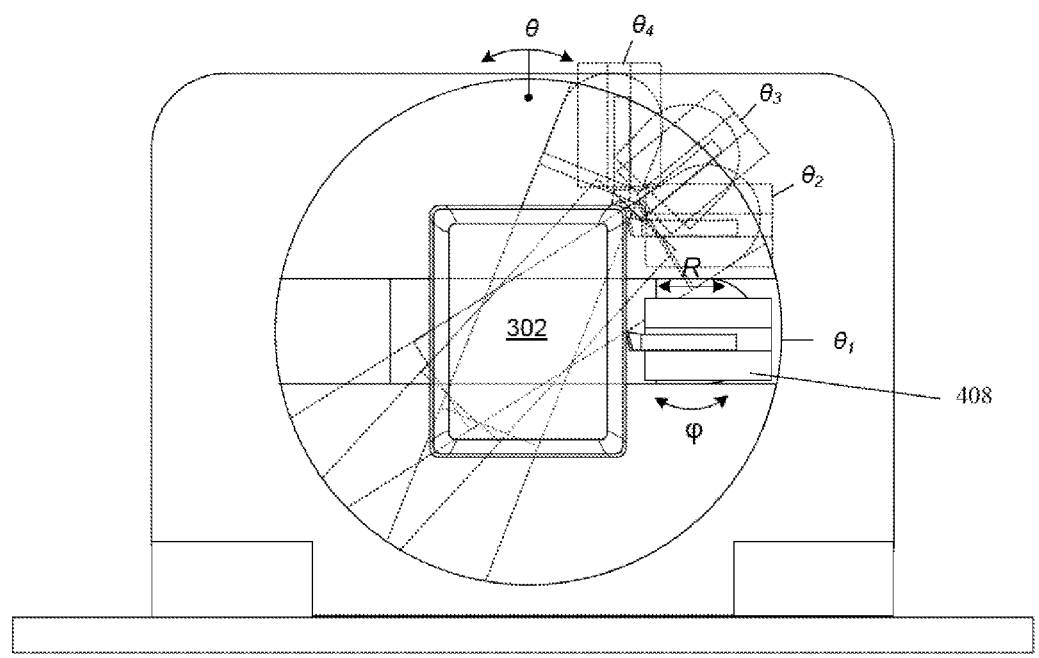
FIG. 6 shows another front view of the free form cutting machine, showing the cutting tool reorienting and cutting as it cuts around the corner of the device.

FIG. 6 shows another front view of the embodiment from FIG. 2. This view shows the motion of servo rotary drive 408 with relation to cutting done around the curve of a spline shaped workpiece 302. Between position $\theta_2$ and position $\theta_4$, the servo rotary drive must rotate 90 degrees for only 30-40 degrees of spindle 208 rotation. For a configuration like this the servo rotary drive rotates about three times faster than the spindle. In addition to this rotational speed it must also be accurate enough to maintain cutting tool angle 502 (not shown) accurately enough to maintain a smooth surface.

Figure 7A:
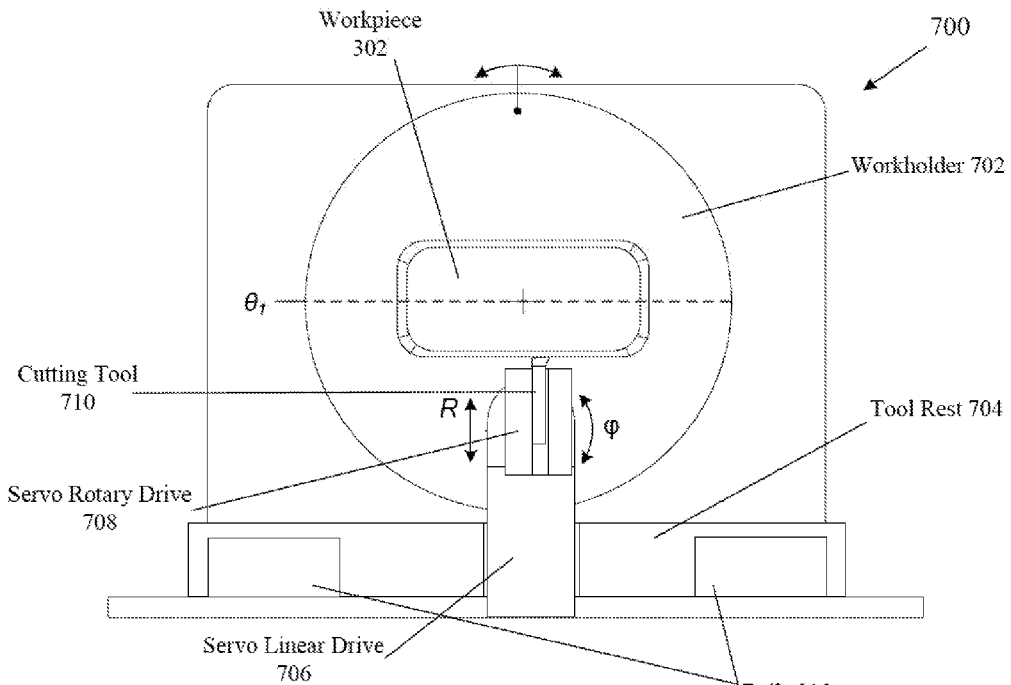
FIGS. 7A and 7B shows a front view of an alternate embodiment of the free form cutting machine, in which the cutting tool is mounted on a tool rest, and the workpiece is spinning.
Figure 7B:
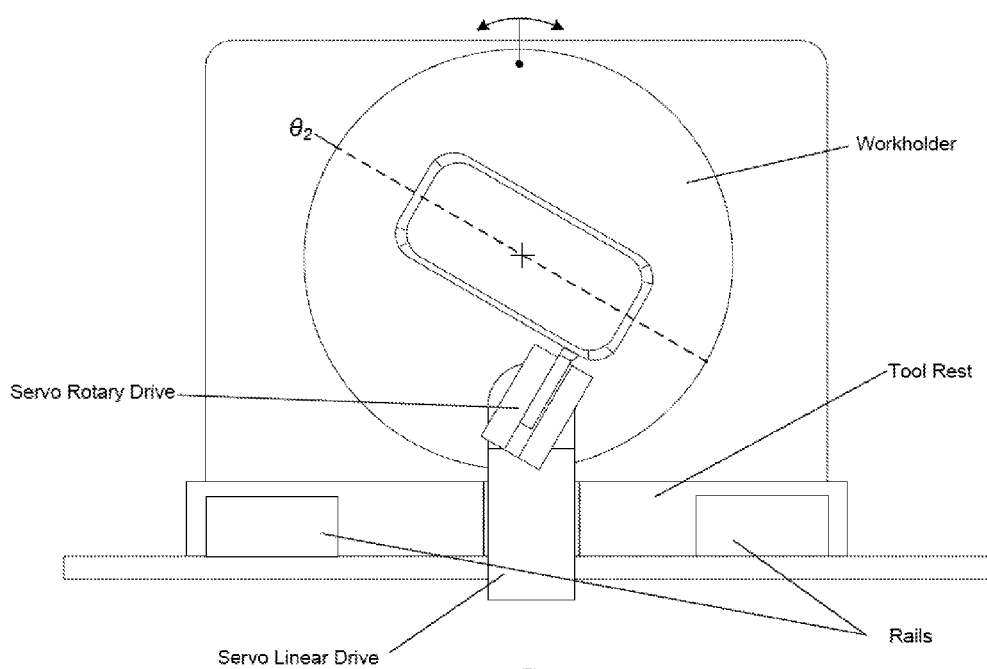

FIG. 7A show an alternate embodiment of free form cutting machine 200 shown in FIG. 2 as free form cutting machine 700. In this embodiment the position of the cutting tool and the workpiece is essentially swapped. Spindle 208 (not shown), instead of rotating a cutting tool, rotates workpiece 302 which is attached to spindle 208 by workholder 702. Workholder 702 can be embodied by a chuck, which is the most common type of workholder used on a lathe. The chuck typically has a certain number of jaws which clamp onto the workpiece, to keep it firmly in place during the machining process. Instead of having a table to hold workpiece 302, there is a tool rest 704 mounted on rails 210. Toolholder 704 is used to mount servo linear drive 706, which connects to servo rotary drive 708, which is attached to cutting tool 710. Servo linear drive 704 and servo rotary drive 706 are still used to position cutting tool 708 with respect to the surface of workpiece 302. FIG. 7B is provided to show how cutting tool 710 moves relative to workpiece 302, from its new location on tool rest 704.

Figure 8:
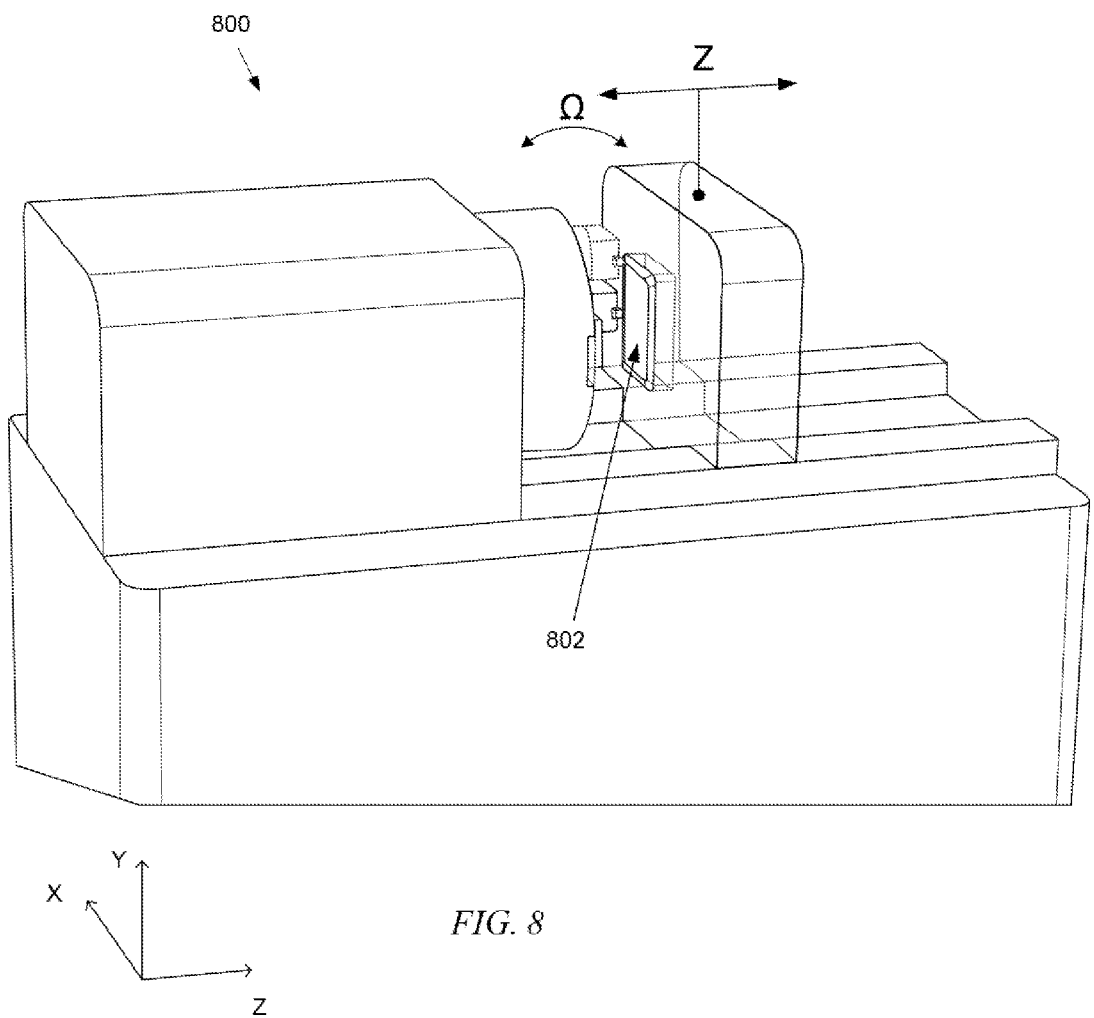
FIG. 8 shows another alternate embodiment of the free form cutting machine in which a third servo is added to allow for movement of the cutting tool in the Z axis.

FIG. 8 shows another embodiment of the free form cutting machine. In this embodiment there can be a third servo for orienting the cutting tool an angle $\Omega$ in a direction parallel to the Z-axis. For example, where a servo linear drive is connected to a first servo rotary drive, which is connected to a second servo rotary drive, where a cutting tool 808 is mounted to second servo rotary drive 806. This adds an additional degree of freedom for the cutting tool. This is especially valuable when it is desirable to use a single edged cutting tool to shape a narrow spline shaped lip portion around the outside edge of workpiece 802. This configuration simply allows the tool to be reoriented an angle $\Omega$ as it traverses in the Z direction. This additional modification could be made to free form cutting machine 200 or free form cutting machine 700.

Figure 9:
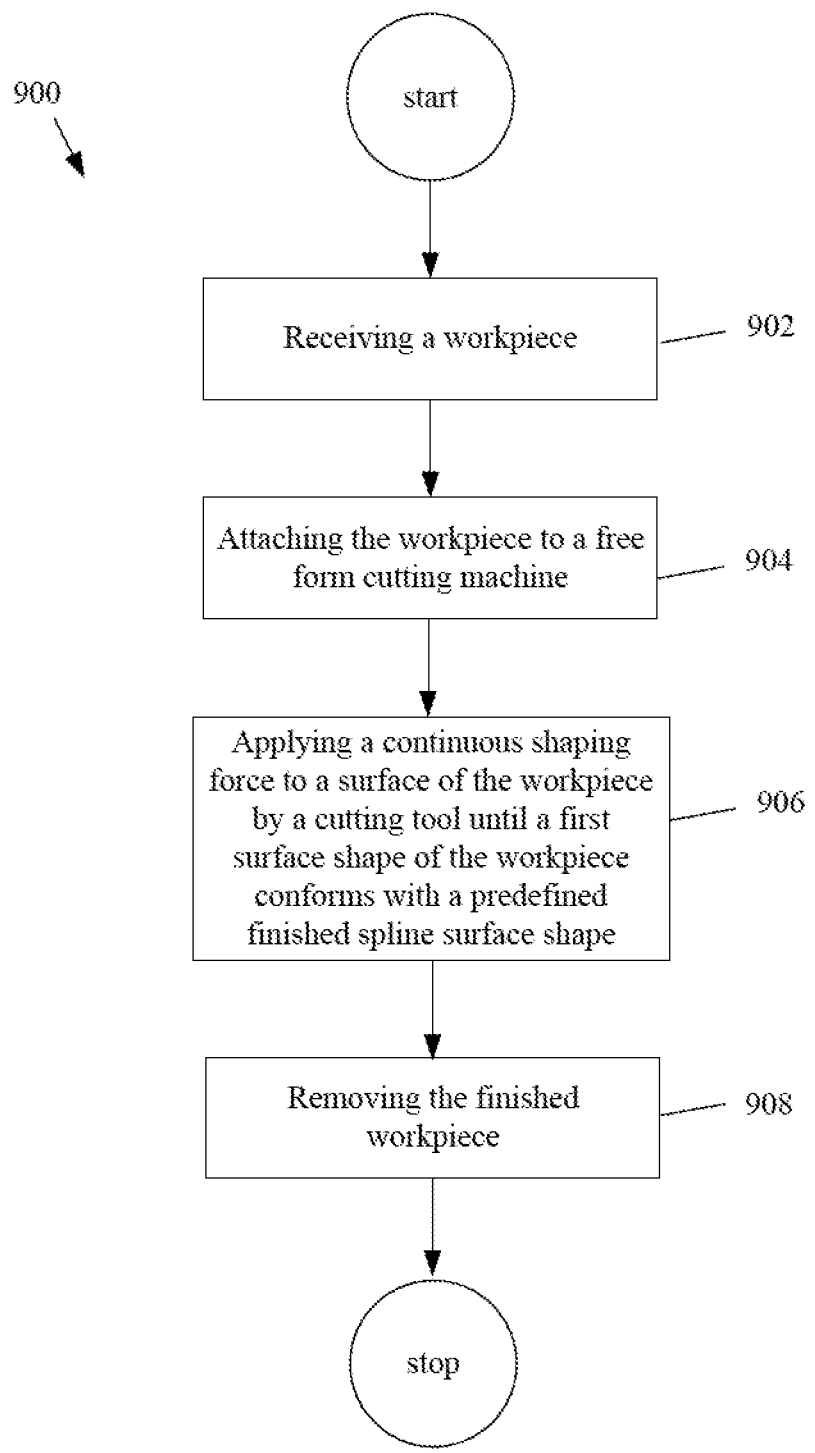
FIG. 9 shows a method for using the free form cutting machine.

FIG. 9 shows a flow chart depicting process 900 for using a free form cutting machine in accordance with the described embodiments. Process 900 can be carried out by receiving a workpiece at 902. Once the workpiece has been received, the workpiece can be secured to the free form cutting machine at 904. In embodiment, the workpiece can be secured using a vacuum generated at a portion of the free form cutting machine in the form of a table on which the workpiece is secured. At 906, a continuous shaping force is applied to a surface of the workpiece by a cutting tool until a first surface shape of the workpiece conforms with a predefined finished spline surface shape In the described embodiment, the cutting tool is maintained at a predetermined cutting tool angle at all points on the workpiece surface, in accordance with the surface of the workpiece, despite rapid variations in workpiece surface geometry. Once the shape of the workpiece conforms to the predefined spline surface shape, the finished workpiece is removed from the free form cutting machine at 908 and process 900 ends.

Figure 10:
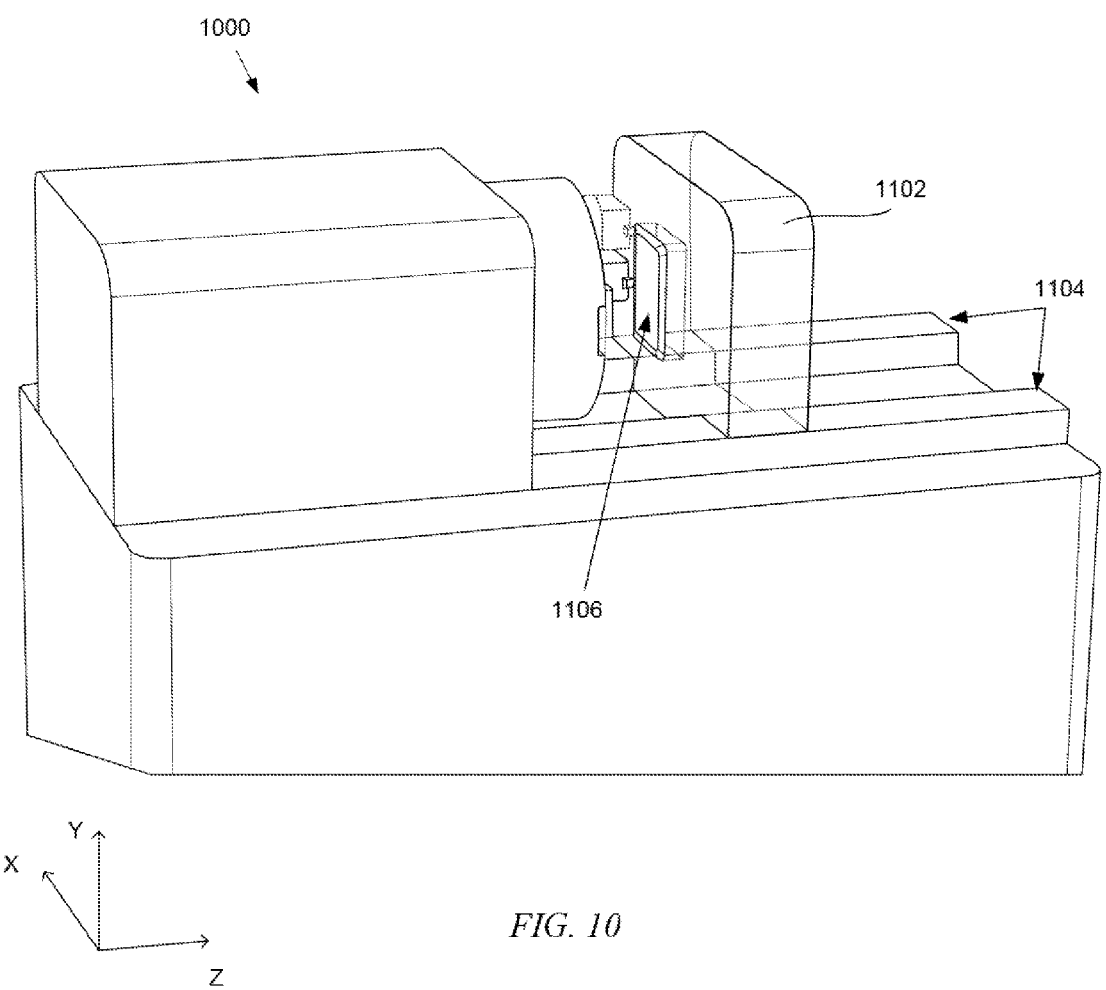
FIG. 10 shows a slight alteration of the free form cutting machine of FIG. 2 in which the table can adjust the workpiece in more axes.

FIG. 10 shows another embodiment of the free form cutting machine that is a slight modification to the embodiment shown by free form cutting machine 200 of FIG. 2. In this embodiment table 1102, in addition to being able to move on rails 1104, also has a mechanism for maneuvering a workpiece 1106 in the X and Y axes.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the invention. Thus, the foregoing descriptions of specific embodiments are presented for purposes of illustration and description. They are not intended to be exhaustive or to limit the invention to the precise forms disclosed. It will be apparent to one of ordinary skill in the art that many modifications and variations are possible in view of the above teachings.

What is claimed is:

1. A method of machining a workpiece, comprising:
    applying a continuous shaping force to a surface of the workpiece by a cutting tool until a first surface shape of the workpiece conforms with a predefined finished surface shape, wherein applying the continuous shaping force comprises:
        adjusting an orientation angle of the cutting tool with respect to the workpiece surface using a servo rotary drive rigidly coupled to the cutting tool, wherein the servo rotary drive and cutting tool rotate together about a first center of rotation, and
        adjusting a distance between the cutting tool and the workpiece surface using a servo linear drive coupled to one end of the servo rotary drive, wherein the servo linear drive, the servo rotary drive and the cutting tool rotate together about a second center of rotation different than the first center of rotation.

2. The method as recited in claim 1, wherein the cutting tool is maintained at a predetermined cutting tool angle at all points of the workpiece surface, the predetermined cutting tool angle comprises:
    a rake angle, the rake angle being an angle between a vector normal to the workpiece surface and a cutting tool flank; and
    a relief angle, the relief angle being an angle between a vector tangent to the workpiece surface and a cutting tool face.

3. The method as recited in claim 1, wherein the cutting tool is formed of cutting tool material selected from the group consisting of: high speed steel, carbide, cobalt steel, cubic boron nitride, polycrystalline diamond, and silicon crystal diamond.

4. The method as recited in claim 3, wherein a rake angle and a relief angle of the cutting tool can be adjusted in accordance with material properties of the workpiece and the cutting tool.

5. The method as recited in claim 1, wherein the machining is completed in a single set of rotational passes about the workpiece.

6. The method as recited in claim 1, wherein the method is performed only to finish the surface of the workpiece.

7. The method as recited in claim 1, wherein the servo linear drive is rigidly coupled with a disc through a center of the disc.

8. The method as recited in claim 1, wherein the workpiece is held in place by a table which is attached to a pair of rails, the rails allowing the table to move in a direction perpendicular to a face of a spindle.

9. The method as recited in claim 1, wherein the workpiece is held in place by a table which is attached to a pair of rails, the rails allowing the table to move in a direction perpendicular to a face of a spindle, wherein the table also has means for moving the workpiece in any direction parallel to the face of the spindle.

10. The method as recited in claim 1, wherein the servo rotary drive is a first servo rotary drive, wherein the cutting tool is connected to a second servo rotary drive coupled to the first servo rotary drive, the method further comprising:
    rotating the cutting tool and the second servo rotary drive about a third center of rotation different than each of the first and second centers of rotation.

11. The method as recited in claim 10, wherein the second rotary servo drive provides an additional degree of freedom for applying the continuous shaping force.

12. The method as recited in claim 4, wherein the servo rotary drive is a first servo rotary drive, wherein the cutting tool is connected to a second servo rotary drive coupled with the first servo rotary drive, the method further comprising:
    rotating the cutting tool and the second servo rotary drive about a third center of rotation different than each of the first and second centers of rotation
    wherein the consistent rake angle and relief angle is achieved by a combined motion of the first and second servo rotary drives.

13. The method as recited in claim 12, wherein the workpiece is held in place by a table which is attached to a pair of rails, the rails allowing the table to move in a direction perpendicular to a face of a spindle.

14. A free form cutting machine, comprising:
    a spindle configured to rotate about a first center of rotation; and
    a cutting arrangement attached to the spindle, the cutting arrangement configured to rotate about a second center of rotation different than the first center of rotation and having:
        a cutting tool arranged to cut portions from a workpiece,
        a servo linear drive configured to control a distance between the cutting tool and the workpiece during a cutting operation, and
        a servo rotary drive coupled to one end of the servo linear drive and rigidly coupled to the cutting tool, the servo rotary drive configured to control an orientation angle of the cutting tool with respect to the workpiece surface during a cutting operation, wherein the free form cutting machine causes the cutting tool to apply a continuous shaping force to the workpiece surface until a first surface shape of the workpiece conforms with a predefined finished spline surface shape.

15. The free form cutting machine as recited in claim 14, wherein the cutting tool is maintained at a predetermined cutting tool angle at all points on the workpiece surface in accordance with the workpiece surface despite rapid variations in workpiece surface geometry.

16. The free form cutting machine as recited in claim 15, wherein the predetermined cutting tool angle comprises:
    a rake angle, the rake angle being an angle between a vector normal to the workpiece surface and a cutting tool flank; and
    a relief angle, the relief angle being an angle between a vector tangent to the workpiece surface and a cutting tool face.

17. The free form cutting machine as recited in claim 14, wherein the cutting tool is formed of cutting tool material selected from the group consisting of: high speed steel, carbide, cobalt steel, cubic boron nitride, polycrystalline diamond, and silicon crystal diamond.

18. The free form cutting machine as recited in claim 17, wherein a rake angle and relief angle of the cutting tool can be adjusted in accordance with material properties of the workpiece and the cutting tool.

19. The free form cutting machine as recited in claim 14, wherein the free form cutting machine is configured to complete a cutting operation of the workpiece using a single set of rotational passes about the workpiece.

20. The free form cutting machine as recited in claim 14, wherein the cutting arrangement further comprises:
    a rotating disc rigidly attached to and rotated by the spindle, wherein the servo linear drive is rigidly attached to the rotating disc through the second center of rotation.

21. The free form cutting machine as recited in claim 14, wherein the workpiece is held in place by a table which is attached to a pair of rails, the rails allowing the table to move in a direction perpendicular to a face of the spindle.

22. The free form cutting machine as recited in claim 21, wherein the workpiece is held in place by a table which is attached to a pair of rails, the rails allowing the table to move in a direction perpendicular to the face of the spindle, wherein the table also has means for moving the workpiece in any direction parallel to the face of the spindle.

23. The free form cutting machine as recited in claim 22, wherein the cutting tool is connected to a second type positioning mechanism, the second type positioning mechanism comprising:
    a tool rest;
    a servo linear drive, rigidly attached to the tool rest;
    a servo rotary drive, rigidly attached to one end of the servo linear drive; and
    the cutting tool, rigidly attached to the servo rotary drive; wherein the consistent rake angle and relief angle is achieved by the combination of the servo drives.

24. A non-transient computer readable medium storing computer code executable by a processor coupled to a free form cutting machining for machining a workpiece, comprising:
    computer code for applying a continuous shaping force to a surface of the workpiece by a cutting tool until a first surface shape of the workpiece conforms with a predefined finished surface shape;
    computer code for adjusting an orientation angle of the cutting tool with respect to the workpiece surface using a servo rotary drive rigidly coupled to the cutting tool, wherein the servo rotary drive and cutting tool rotate together about a first center of rotation; and
    computer code for adjusting a distance between the cutting tool and the workpiece surface using a servo linear drive coupled to one end of the servo rotary drive, wherein the servo linear drive, the servo rotary drive and the cutting tool rotate together about a second center of rotation different than the first center of rotation.

25. The non-transient computer readable medium as recited in claim 24, wherein the cutting tool is maintained at a predetermined cutting tool angle at all points on the workpiece surface, wherein the predetermined cutting tool angle comprises:

a rake angle, the rake angle being an angle between a vector normal to the workpiece surface and a cutting tool flank; and a relief angle, the relief angle being an angle between a vector tangent to the workpiece surface and a cutting tool face, and wherein the cutting tool is formed of cutting tool material selected from the group consisting of: high speed steel, carbide, cobalt steel, cubic boron nitride, polycrystalline diamond, and silicon crystal diamond.

* * * * *

UNITED STATES PATENT AND TRADEMARK OFFICE
CERTIFICATE OF CORRECTION

PATENT NO. : 8,827,611 B2  
APPLICATION NO. : 13/218212  
DATED : September 9, 2014  
INVENTOR(S) : Piotr S. Trzaskos et al.

Page 1 of 1

It is certified that error appears in the above-identified patent and that said Letters Patent is hereby corrected as shown below:

In the Claims:

Column 7, line 62 (Claim 14, line 15): "the workpiece" should read --a workpiece--.

Column 8, line 51 (Claim 23, line 10): "the consistent" should read --a consistent--.

Signed and Sealed this
Twenty-third Day of December, 2014

Michelle K. Lee
*Deputy Director of the United States Patent and Trademark Office*